UNITED STATES PATENT OFFICE.

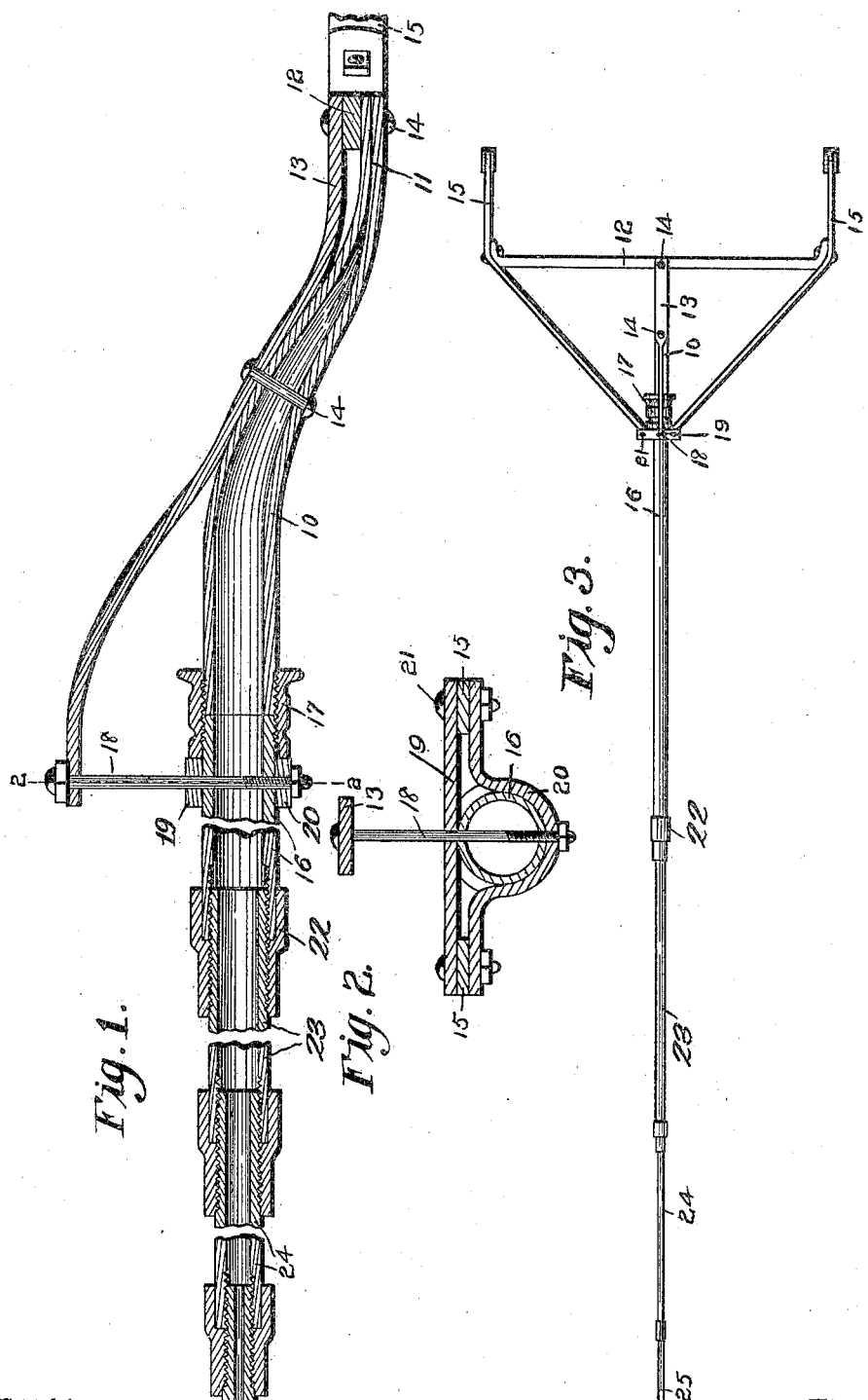

ALONZO L. SUMNER, OF GUTHRIE CENTER, IOWA.

VEHICLE-POLE.

951,429.

Specification of Letters Patent.  Patented Mar. 8, 1910.

Application filed August 28, 1908. Serial No. 450,660.

*To all whom it may concern:*

Be it known that I, ALONZO L. SUMNER, a citizen of the United States, residing at Guthrie Center, in the county of Guthrie and State of Iowa, have invented a certain new and useful Vehicle-Pole, of which the following is a specification.

The object of my invention is to provide a vehicle pole of simple, durable and inexpensive construction, that may be formed principally of metal pipe sections of different diameters, so that the pole may be formed tapered from its rear to its front end and also to provide improved means for connecting the pipe sections with each other to form strong and durable joints that cannot readily become unscrewed and loosened.

My invention consists in the construction, arrangement and combination of the various parts of the device whereby the objects contemplated are attained as hereinafter more fully set forth, pointed out in my claim, and illustrated in the accompanying drawings, in which—

Figure 1 shows a vertical, central, sectional view through the vehicle pole embodying my invention. Fig. 2 shows a sectional view on the line 2—2 of Fig. 1, and—Fig. 3 shows a plan view of a vehicle pole embodying my invention.

Referring to the accompanying drawings, I have used the reference numeral 10 to indicate the rear end portion of the vehicle pole. This is made of a metal pipe having its rear end flattened at 11 and its forward end provided with a straight screw thread. The vehicle pole hound is made of a metal bar 12 which metal bar is connected to the flattened portion of the pole member 10 by being inserted under the metal strap 13 which forms the king bolt holder. This metal strap is connected with the member 10 by means of a number of rivets 14, as clearly shown in Fig. 1. At the ends of the hound 12 are the metal brace bars 15. The pole section next in front of the part 10 is made of a piece of metal pipe 16 of the same diameter as the pipe 10 and screw threaded on its exterior at the rear end, said end being inserted in a pipe coupling 17 of ordinary construction.

Near the rear end of the pipe section 16 is a vertical opening to receive the king bolt 18. Above the rear end of the pipe section 16 is a straight metal bar 19 and below it is a curved metal bar 20. The ends of said bars are spaced apart to receive the forward ends of the braces 15 and the parts 19, 15 and 20 are connected by the bolts 21. The king bolt 18 also extends through the metal bars 19 and 20. By this arrangement it is obvious that a firm support for the braces 15 is provided and also that so long as the king bolt 18 is in position the members 10 and 16 are held against rotation relative to each other.

At the forward end of the pole member 16 is a coupling having the general shape of an ordinary reducing coupling. It comprises a body portion 22 having a large opening at its rear end designed to receive the rear section 16 and a smaller opening at its forward end, the latter being screw threaded on its interior and designed to receive a pipe section 23, the part into which the pipe section 23 is inserted being provided with an internal screw thread designed to engage the external screw thread on the rear of the pipe section 23. The pipe section 16 is screw threaded on its interior to receive the pipe 23. In assembling these parts, the coupling 22 is first screwed on to the pipe 23, then the pipe 23 is screwed into the pipe 16 and after it is in proper position then the coupling 22 is turned on the pipe 23 until it firmly engages the end of the pipe 16. In this way said coupling is made to perform the double function of strengthening and reinforcing the connection between the two pipes and also to serve as a nut-lock to prevent unscrewing movements of the pipe section 23. At the forward end of the pipe section 23 is a smaller pipe section 24 connected with the pipe section 23 in the same manner that the pipe section 23 is connected to the part 16 and at the forward end of the pipe section 24 is a vehicle pole head 25 of ordinary construction.

One of the material advantages of my invention is that the various coupling devices may be supplied to black-smiths and vehicle pole manufacturers and they may then readily and easily construct vehicle poles by simply using ordinary pipes cut to the desired lengths and screw threaded at their ends, and after the parts are once assembled, the various sections will not readily turn relative to each other and a strong and durable and inexpensive vehicle pole is provided.

I claim as my invention.

An improved pole, comprising a rear section formed of metal tubing having external screw threads at its forward end, and a king bolt strap fixed to its rear portion and extended forwardly beyond its forward end, a vehicle hound fixed to the rear end thereof, a forward pole section made of metal tubing, a coupling having both of said pole sections screwed into it, two cross pieces fixed together above and below the forward pole section near its rear end, a king bolt passed through the king bolt strap, both of said cross pieces and the forward pole section, and brace rods secured between the ends of said cross pieces and also secured to the ends of said hound, arranged and combined substantially in the manner set forth, and for the purposes stated.

Des Moines, Iowa, Aug. 4, 1908.

ALONZO L. SUMNER.

Witnesses:
W. H. Cahail,
D. L. Cahail,
J. D. Brown.